(No Model.) 4 Sheets—Sheet 1.

F. OTT.

CLOTH SHEARING MACHINE.

No. 506,067. Patented Oct. 3, 1893.

WITNESSES:
James H. Bell
Randolph Parker.

INVENTOR
Frederick Ott
by his atty
Henry N. Paul Jr.

(No Model.)

4 Sheets—Sheet 2.

F. OTT.

CLOTH SHEARING MACHINE.

No. 506,067

Patented Oct. 3, 1893.

WITNESSES:
James H. Bell
Randolph Sailer

INVENTOR
Frederick Ott
by his atty
Henry N. Paul Jr.

(No Model.)

4 Sheets—Sheet 3.

F. OTT.

CLOTH SHEARING MACHINE.

No. 506,067.

Patented Oct. 3, 1893.

WITNESSES:

James H. Bell

Randolph Sailer

INVENTOR

Frederick Ott by his atty

Henry N. Paul Jr.

(No Model.)
4 Sheets—Sheet 4.
F. OTT.
CLOTH SHEARING MACHINE.
No. 506,067. Patented Oct. 3, 1893.
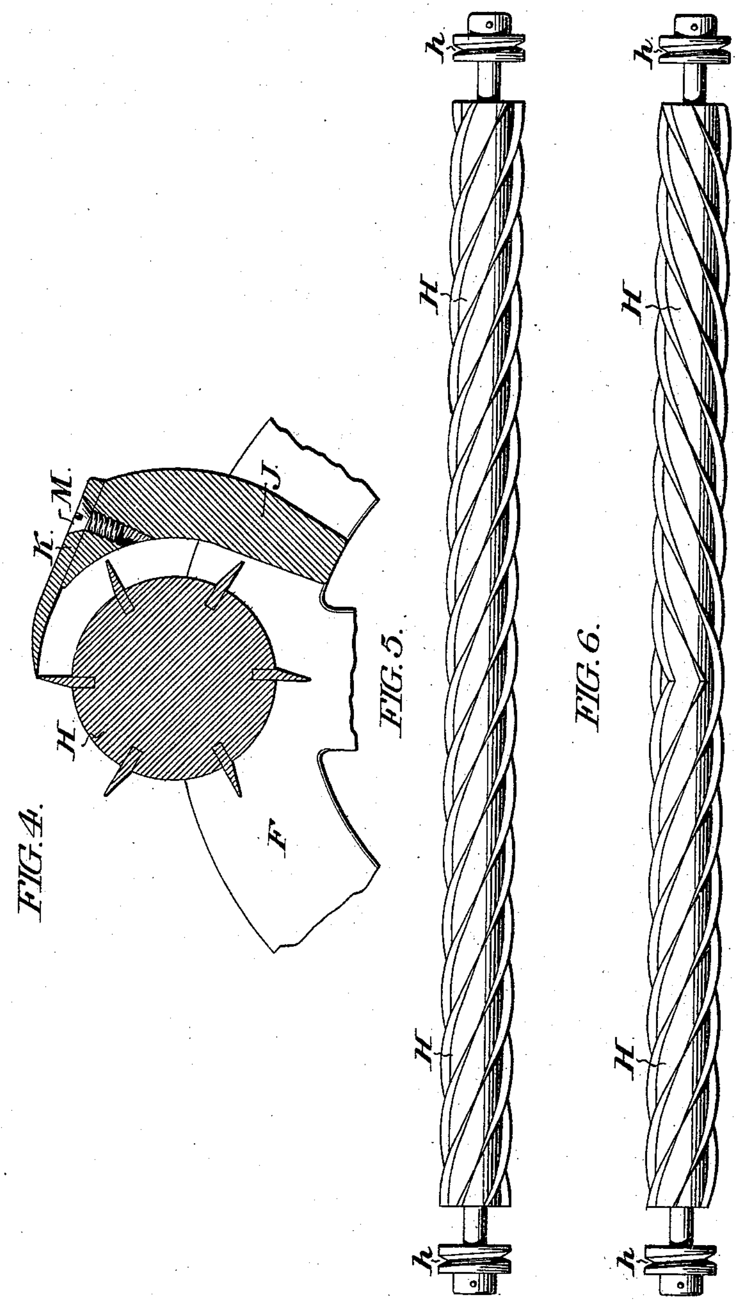
WITNESSES: James H. Bell. Randolph Bailey
INVENTOR
Frederick Ott by his Atty Henry N. Paul Jr.

UNITED STATES PATENT OFFICE.

FREDERICK OTT, OF GLOUCESTER CITY, NEW JERSEY.

CLOTH-SHEARING MACHINE.

SPECIFICATION forming part of Letters Patent No. 506,067, dated October 3, 1893.

Application filed April 19, 1893. Serial No. 470,958. (No model.)

*To all whom it may concern:*

Be it known that I, FREDERICK OTT, of Gloucester City, in the State of New Jersey, have invented certain new and useful Improvements in Cloth-Shearing Machines, whereof the following is a specification, reference being had to the accompanying drawings.

My invention relates to a machine in which shearing rollers and brushing rollers alternate with each other around the circumference of a pair of revolving drums, which rollers (both shearing and brushing) are themselves rotated at any desired speed and in either direction, according to the system pursued in the class of napping machines known as rotary or epicycloidal nappers.

Figure 1:
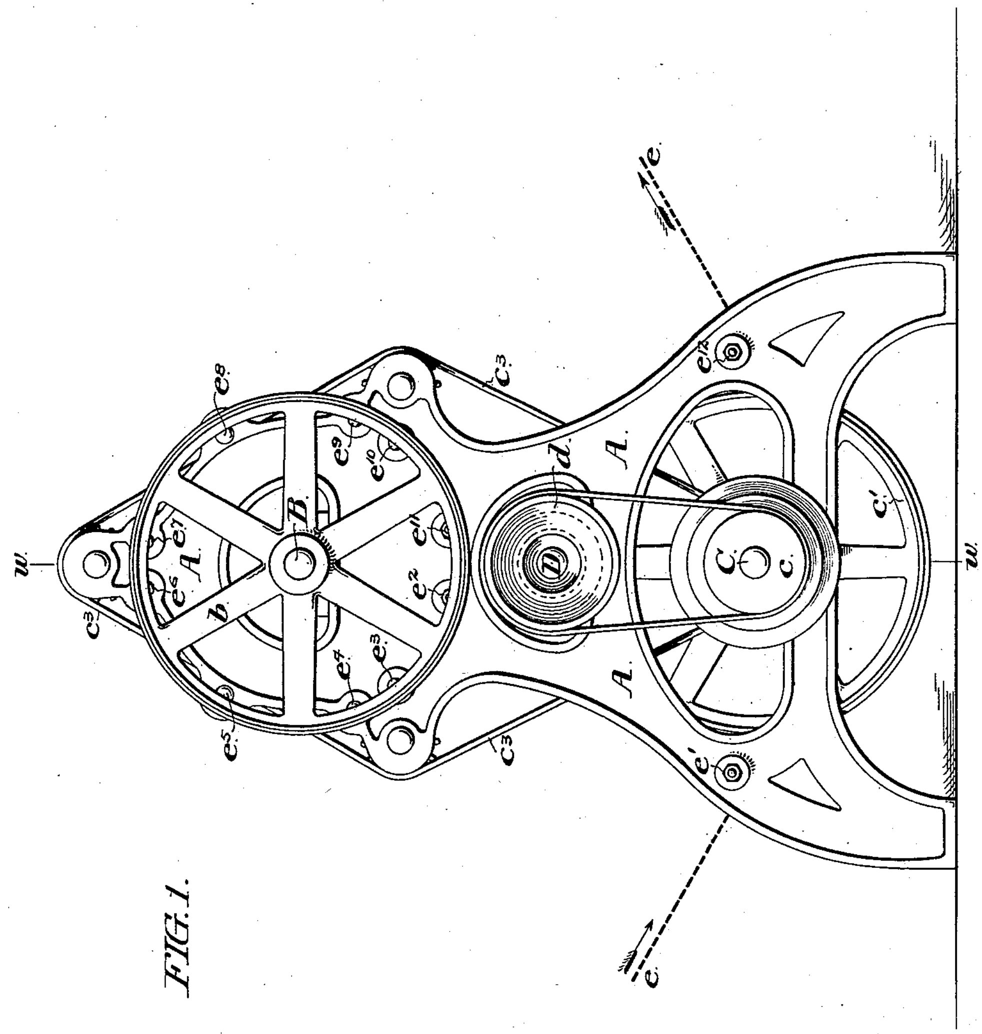
Figure 2:
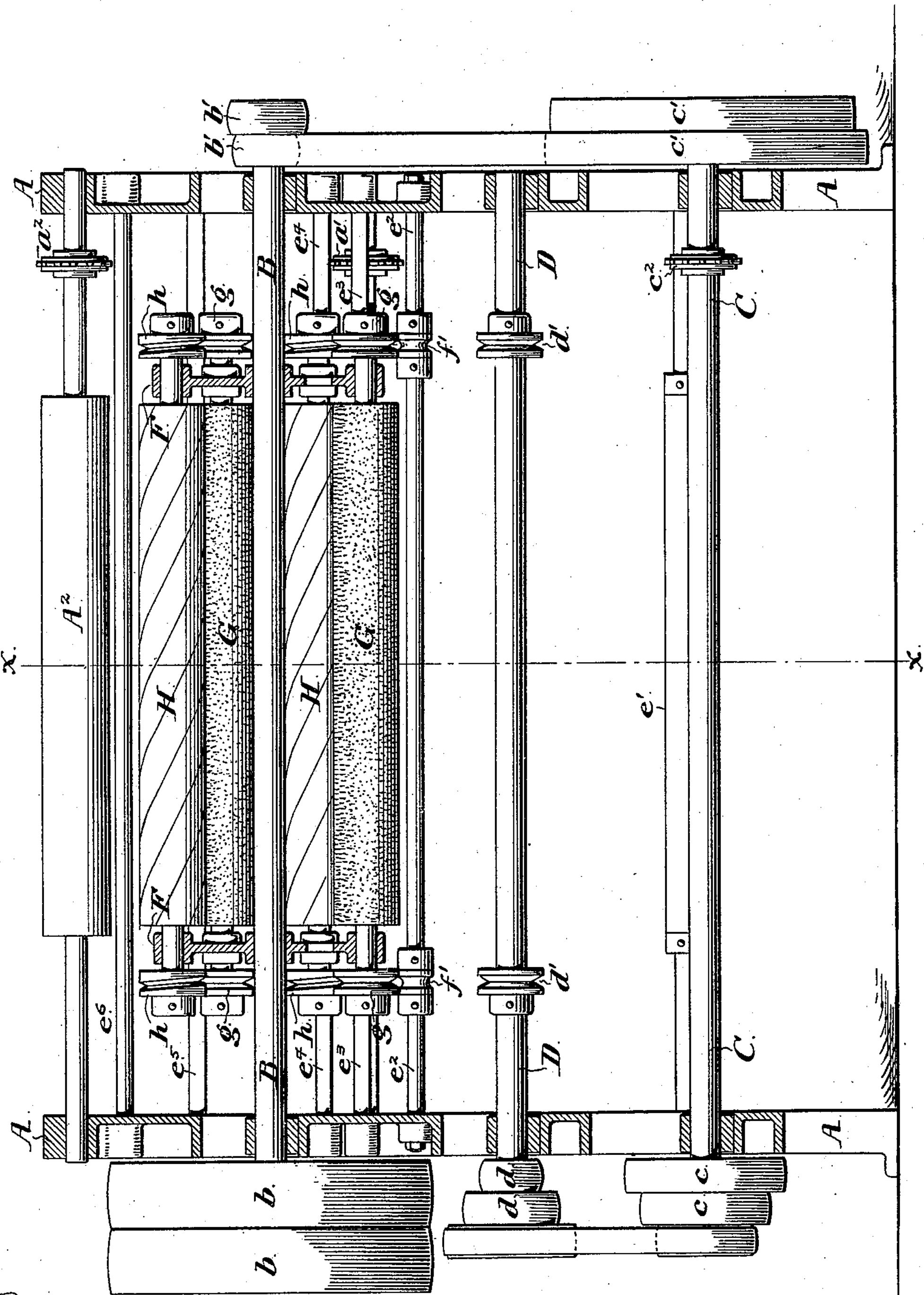
Figure 3:
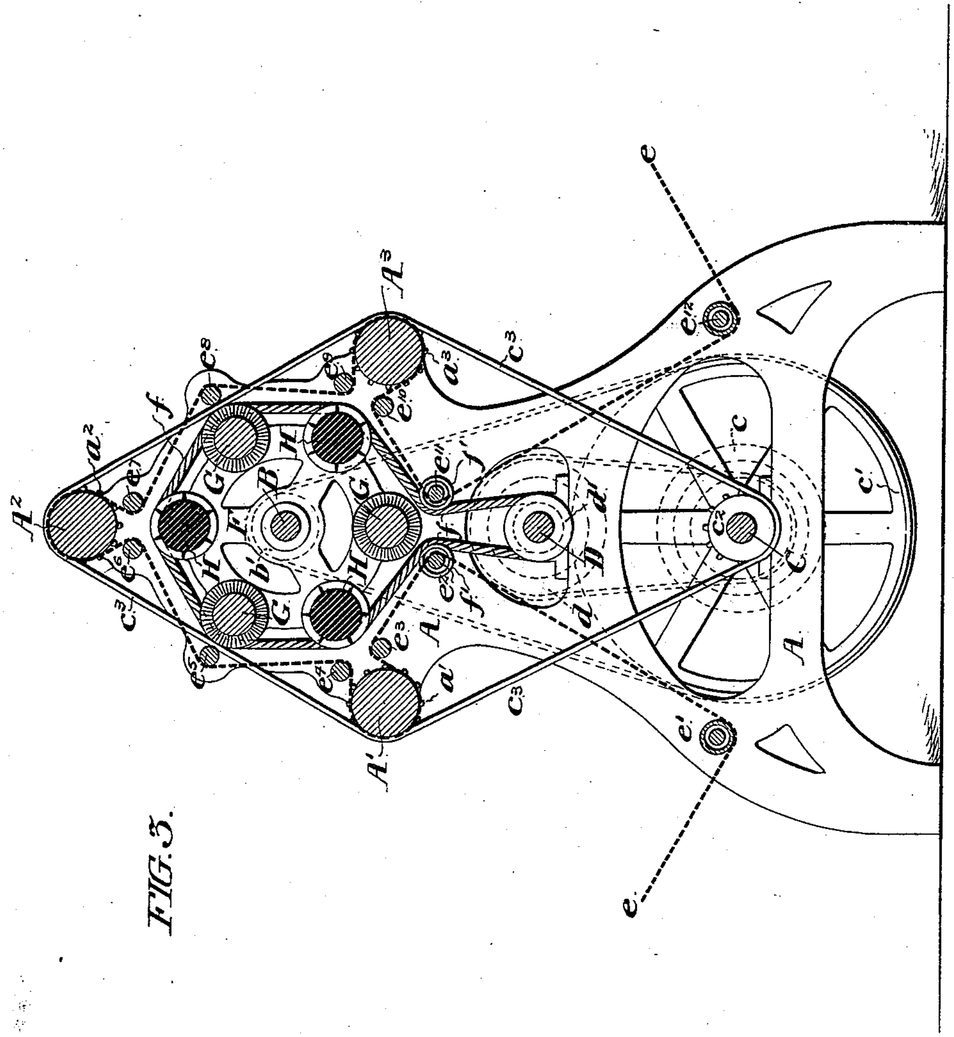

Figure 1 is an end elevation of my device. Fig. 2 is a vertical longitudinal section through $w$ $w$, Fig. 1. Fig. 3 is a vertical cross-section through $x$ $x$, Fig. 2. Fig. 4 is an enlarged cross-section of one of the shearing rollers and ledger blade. Figs. 5 and 6 are enlarged views of two forms of the shearing rollers.

A, A, are the side frames of the machine.

B, is the main driving shaft, carrying the fast and loose pulleys $b$, $b$.

C, is a subsidiary shaft driven from the shaft B, by means of the speed pulleys $b'$, $b'$, $c'$, $c'$.

D is a second subsidiary shaft driven from the shaft C by means of the speed pulleys $c$ $c$, $d$ $d$.

A′, A², A³, are cloth rollers supported between the side frames. $e'$, $e^2$, $e^3$, $e^4$, $e^5$, $e^6$, $e^7$, $e^8$, $e^9$, $e^{10}$, $e^{11}$, $e^{12}$, are stretching rods similarly supported. The cloth or fabric to be sheared passes around these cloth rollers and stretching rods in the following order: $e'$, $e^2$, $e^3$, A′ $e^4$, $e^5$, $e^6$, A² $e^7$, $e^8$, $e^9$, A³, $e^{10}$, $e^{11}$, $e^{12}$, its course being indicated by the dotted line $e$, $e$, Fig. 3.

The cloth rollers A′, A², A³, have fixed upon their shafts sprocket wheels $a'$, $a^2$, $a^3$, around the outside of which passes an endless sprocket chain $c^3$, driven from the sprocket wheel $c^2$, on the shaft C, which thus imparts motion to the cloth rollers and to the fabric passing around them.

Upon the shaft B, are fixed two drums F, F. Between these drums and at intervals around their circumference is mounted a series of revolving rollers, these rollers being alternately brushing rollers G, G, G, and shearing rollers H, H, H. The diameter of the revolving drums, and of these rollers is such that as the drums revolve the outside edges of the revolving rollers are tangent or nearly so to the fabric as it passes from stretching rod to stretching rod. The shafts of the rollers G, H, project through the bearings in the drums F, F, and carry pulleys or sheaves $g$, $h$, affixed to both ends, all these pulleys at either end being mounted in the same vertical plane. An endless band or cord $f$, at each end passes around the outside of all these pulleys, and being guided down by the small pulleys $f'$, running upon the stretching rods $e^2$, $e^4$, passes around and is driven by the pulley $d'$, fixed on the shaft D. The relative speed of rollers and drums may be varied at will by means of the speed pulleys which have been described in the manner well understood in napping machinery of this general type.

In addition to their motion of revolution, the shearing rollers H, have a slight lateral motion. This is effected by the groove of the pulleys $h$, which in its course around the pulley passes from one side to the other describing a wavy line. As the cord $f$, revolves constantly in the same plane, the pulleys $h$, $h$, and with them the shearing rollers H, H, are drawn laterally from side to side according to which portion of the groove of the pulley the cord is in contact with. The grooves of the pulleys at both ends of either shearing roller H, are made to correspond in inclination so that both ends are drawn in the same direction at the same time.

The shearing rollers in Figs. 1, 2 and 3, are shown without any ledger blades opposed to them and for many kinds of light fabric none are necessary. In Fig. 4, however, such a ledger blade is shown in position. H is a shearing roller shown in section. A bar J passes between the two drums F, F, immediately alongside of the roller upon the outside edge of which is fastened the ledger blade K, its position being so adjusted that the knife edge is situated just outside the cutting edges of the shearing rollers and opposed to them at the point farthest from the center of the drums, F. The blade K is fastened to the bar J, by screws M passing through slots in the former, whereby its position may be regulated.

Figs. 3 and 6 show different arrangements of the cutting blades upon the shearing rollers; in Fig. 5 the spiral being continuous and in Fig. 6 it being broken in the middle.

The operation of my device is as follows: As the cloth passes continuously over the stretching rods through the machine, its surface is subjected to the rapidly alternating action of the brushing rollers and shearing rollers, the former brushing the nap into an upright position and the latter clipping it to the proper length. The drums carrying the two varieties of rollers revolve so rapidly that the brushing and clipping are repeated a great many times in the course of the passage of the fabric through the machine. The length of time which elapses between the action of any one of the brushing rollers and the action of the succeeding shearing rollers is so short that the nap which has been raised by the former has not time to fall before it is clipped.

In addition to the function of brushing the nap up into a position to be cut, the brushes perform the additional function of brushing out the clippings which have been cut off.

Having thus described my invention, I claim—

1. In a cloth shearing machine the combination of the main shaft B, the drums F on said shaft, the shearing rollers H, carried between the drums at intervals around their peripheries, means for producing axial rotation of the shearing rollers, and cloth rollers mounted outside of the revolving drums F, substantially as described.

2. In a cloth shearing machine the combination of the main shaft B, the drums F on said shaft, the shearing rollers H, carried between the drums at intervals around their peripheries, ledger blades K, mounted between said drums in opposition to the cutting edges of the shearing rollers, means for producing axial rotation of the shearing rollers, and cloth rollers mounted outside the revolving drums, substantially as described.

3. In a cloth shearing machine the combination of the main shaft B, the drums F on said shaft, the shearing rollers H, carried between the drums at intervals around their peripheries, means for producing axial rotation of the shearing rollers, means for producing lateral oscillation of the shearing rollers, and cloth rollers mounted outside the revolving drums F, substantially as described.

4. In a cloth shearing machine the combination of the main shaft B, the drums F on said shaft, the shearing rollers H, carried between the drums at intervals around their peripheries, the brushing rollers G also carried between the drums around their peripheries and alternating with the shearing rollers, means for producing axial rotation of the shearing rollers and brushing rollers, and cloth rollers mounted outside the revolving drums F, substantially as described.

5. In a cloth shearing machine the combination of the main shaft B, the drums F on said shaft, the shearing rollers H, carried between the drums at intervals around their peripheries, ledger blades K mounted between said drums in opposition to the cutting edges of the shearing rollers, the brushing rollers G also carried between the drums around their peripheries and alternating with the shearing rollers, means for producing axial rotation of the shearing rollers and brushing rollers, and cloth rollers mounted outside the revolving drums F, substantially as described.

6. In a cloth shearing machine the combination of the main shaft B, the drums F on said shaft, the shearing rollers H, carried between the drums at intervals around their peripheries, the brushing rollers G also carried between the drums around their peripheries and alternating with the shearing rollers, means for producing axial rotation of the shearing rollers and brushing rollers, means for producing lateral oscillation of the shearing rollers, and cloth rollers mounted outside the revolving drums F, substantially as described.

FREDERICK OTT.

Witnesses:
JAMES H. BELL,
E. REESE.